(12) United States Patent
Jiang

(10) Patent No.: US 11,506,927 B2
(45) Date of Patent: Nov. 22, 2022

(54) POLARIZER, MANUFACTURING METHOD THEREOF, AND DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Bei Jiang, Shenzhen (CN)

( * ) Notice: Subject to any disclaimer, the term of this patent is extended or adjusted under 35 U.S.C. 154(b) by 304 days.

(21) Appl. No.: 16/626,534

(22) PCT Filed: Dec. 19, 2019

(86) PCT No.: PCT/CN2019/126773
§ 371 (c)(1),
(2) Date: Dec. 25, 2019

(87) PCT Pub. No.: WO2021/109266
PCT Pub. Date: Jun. 10, 2021

(65) Prior Publication Data
US 2022/0019107 A1    Jan. 20, 2022

(30) Foreign Application Priority Data
Dec. 3, 2019 (CN) .......................... 201911219185.4

(51) Int. Cl.
*G02F 1/1335* (2006.01)
*G02B 5/30* (2006.01)

(52) U.S. Cl.
CPC ..... *G02F 1/133548* (2021.01); *G02B 5/3058* (2013.01); *G02F 1/133514* (2013.01)

(58) Field of Classification Search
CPC ......... G02F 1/133548; G02F 1/133514; G02B 5/3058
USPC .......................................................... 359/485
See application file for complete search history.

(56) References Cited

U.S. PATENT DOCUMENTS

| | | | |
|---|---|---|---|
| 2010/0201909 A1* | 8/2010 | Jung ................. | G02F 1/133617 445/24 |
| 2017/0131593 A1 | 5/2017 | Tang | |
| 2018/0196308 A1* | 7/2018 | Xu .................... | G02F 1/133514 |

FOREIGN PATENT DOCUMENTS

| | | |
|---|---|---|
| CN | 105242342 A | 1/2016 |
| CN | 109445012 A | 3/2019 |

\* cited by examiner

*Primary Examiner* — Edward J Glick
*Assistant Examiner* — William D Peterson

(57) ABSTRACT

The present invention provides a polarizer, a manufacturing method of the polarizer, and a display panel. The polarizer includes a transparent base substrate and a metal wire grid layer arranged on the transparent base substrate. The metal wire grid layer includes at least two wire grid units spaced apart from each other, and each of the wire grid units includes a plurality of metal wires parallel to each other. The transparent base substrate has a light transmissive region and a light emitting region, and the wire grid units are arranged corresponding to the light emitting region.

4 Claims, 4 Drawing Sheets

POLARIZER, MANUFACTURING METHOD THEREOF, AND DISPLAY PANEL

1. FIELD OF DISCLOSURE

The present invention relates to a field of display technology and in particular, to a polarizer and a manufacturing method thereof, and a display panel.

2. DESCRIPTION OF RELATED ART

Transparent display panel is a display technology that has become popular in recent years. Because of its unique transparent display functions, the transparent display panels have attracted great attention. Transparent displays have been used in more and more occasions, such as commercial buildings, merchandise display cases, vending machines, and glass showcases. For a traditional liquid crystal display (LCD), transparent displays can be achieved by the following methods: First, an opaque portion of the liquid crystal display is removed or replaced by a material having high transparency. For example, the ambient light is used to replace a backlight source, and materials are developed to make transparent electrode. Second, the unit pixels of the display panel are designed to be a light transmissive area that allows light to pass through and a light-emitting area for displaying images.

Working principles of the light-emitting area in the transparent display panel are the same as those of an ordinary LCD. A polarizer on one side of an array substrate is orthogonal to a polarization axis of the polarizer on one side of a color filter. When ambient light passes through the polarizer on the array substrate, a polarized light beam parallel to an absorption axis is absorbed, and a polarized light beam parallel to the polarization axis passes through the polarizer, so the ambient light passing through the polarizer becomes linearly polarized light, then the polarized light passes through a voltage-driven liquid crystal layer, and finally the polarized light exits from the polarizer on the color filter. By controlling rotation directions of liquid crystal molecules, a light beam with a specific polarization direction can be obtained, and the intensity of the outgoing light can be controlled by means of the upper and lower polarizers. The color filter can allow light of a specific color to pass, thereby displaying different colors.

In order to see what's behind a display panel, a light transmissive area in a transparent display panel needs to have a high transmittance. However, conventional polarizers will filter out about 40% of ambient light, resulting in a decrease in the overall light transmittance of the transparent display panel. Therefore, users cannot see clearly when viewing through a display screen to see what's behind, which is not conducive to the use of transparent display technology.

SUMMARY

The present invention provides a polarizer and a manufacturing method thereof, and a display panel. The polarizer improves alight output efficiency of a transmission region, thereby improving the overall light transmission region of the display panel.

In order to solve above problems, the present invention provides a polarizer, comprising a base substrate and a metal wire grid layer disposed on the base substrate;

wherein the metal wire grid layer comprises at least two wire grid units spaced apart from each other, each of the wire grid units comprises a plurality of metal wires parallel to each other; and wherein the base substrate is provided with a light transmissive region and a light emitting region, and the wire grid units are disposed corresponding to the light emitting region.

In some embodiments of the present invention, the polarizer further comprises a transparent encapsulation layer, and the transparent encapsulation layer fills between the at least two wire grid units and/or between the metal wires.

In some embodiments of the present invention, each of the metal wires comprises a width ranging from 50 nm to 150 nm and a height ranging from 50 nm to 200 nm, and a distance between each two adjacent metal wires ranges from 50 nm to 150 nm.

In some embodiments of the present invention, each wire grid unit comprises a length ranging from 500 um to 5000 um and a width ranging from 600 um to 1500 um.

The present invention further provides a display panel, comprising a color filter substrate, a first polarizer disposed on the array substrate, and a second polarizer disposed on the color filter substrate, wherein each of the first polarizer and the second polarizer is the polarizer of any of claims 1 to 4.

In some embodiments of the present invention, the light emitting region is arranged corresponding to red, green, blue sub-pixel regions of the color filter substrate, and the light transmissive region is disposed corresponding to a white sub-pixel region of the color filter substrate.

In some embodiments of the present invention, the display panel further comprises a quantum dot color filter, and the quantum dot color filter is disposed in the color filter substrate.

According to some embodiments of the present invention, each of the first polarizer and the second polarizer comprises a base substrate and the metal wire grid layer disposed on the base substrate;

wherein the metal wire grid layer comprises at least two wire grid units spaced from each other, and each of the wire grid units comprises a plurality of metal wires parallel to each other; and wherein the base substrate is provided with a light transmissive region and a light emitting region, and the wire grid units are disposed corresponding to the light emitting region.

According to some embodiments of the present invention, the first polarizer and the second polarizer further comprise a transparent encapsulation layer, and the transparent encapsulation layers fills between the at least two wire grid units and/or between the metal wires.

According to some embodiments of the present invention, each of the metal wires comprises a width ranging from 50 nm to 150 nm and a height ranging from 50 nm to 200 nm, and a distance between each two adjacent metal wires ranges from 50 nm to 150 nm.

According to some embodiments of the present invention, each of the wire grid units comprises a length ranging from 500 um to 5000 um and a width ranging from 600 um to 1500 um.

The present invention further provides a manufacturing method of a polarizer, comprising following steps:

forming an imprint template by electron beam exposure photolithography;

forming a metal layer and a photoresist layer sequentially stacked on a surface of a base substrate;

imprinting the photoresist layer with the imprint template to form a photoresist pattern;

etching the metal layer by using the photoresist pattern as a mask to form a metal wire grid layer, wherein the metal wire grid layer comprises at least two wire grid units spaced from each other, and each of the wire grid units comprises a plurality of metal wires parallel to each other; and removing a remaining photoresist adhesive, and encapsulating the metal wire grid layer with a transparent material to obtain the polarizer;

wherein the base substrate is provided with a light transmissive region and a light emitting region, and the wire grid units are disposed corresponding to the light emitting region.

According to some embodiments of the present invention, forming the imprint template further comprises:

applying a photoresist material on the base substrate by spin-coating and forming a nano-imprint template pattern;

exposing an area of the nano-imprint template pattern on the base substrate using an electron beam exposure machine;

dissolving the exposed area with a developing solution to obtain a photoresist template;

etching the photoresist template; and cleaning the photoresist template to obtain the nano-imprint template.

According to some embodiments of the present invention, the photoresist material is a heat-curable imprint adhesive or a UV-curable imprint adhesive.

According to some embodiments of the present invention, the metal layer and the photoresist layer are formed by a physical vapor deposition method.

According to some embodiments of the present invention, the metal layer is made of one of aluminum, chromium, gold, and nickel.

According to some embodiments of the present invention, the polarizer comprises a base substrate and a metal wire grid layer disposed on the base substrate; and wherein the metal wire grid layer comprises at least two wire grid units spaced from each other, and each of the wire grid units comprises a plurality of metal wires parallel to each other.

According to some embodiments of the present invention, the polarizer further comprises a transparent encapsulation layer, and the transparent encapsulation layer fills between the at least two wire grid units and/or between the metal wires.

According to some embodiments of the present invention, each of the metal wires comprises a width ranging from 50 nm to 150 nm and a height ranging from 50 nm to 200 nm, and a distance between each two adjacent metal wires ranges from 50 nm to 150 nm.

According to some embodiments of the present invention, each of the wire grid units comprises a length ranging from 500 um to 5000 um and a width ranging from 600 um to 1500 um.

Compared to the conventional techniques, the present invention provides a polarizer which has a metal wire grid layer to replace a conventional polarizer, so that a light transmissive region of the conventional polarizer is empty, and only a light emitting region has wire grid units. Since the light transmissive region is empty, light output efficiency of the light transmissive region is improved, and the light transmittance of the entire display panel can be greatly improved.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work.

DETAILED DESCRIPTION OF EMBODIMENTS

Figure 1:
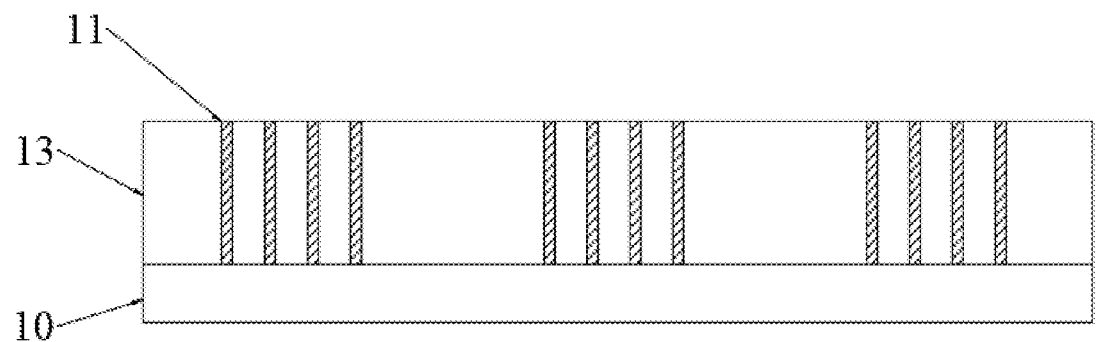
FIG. 1 is a lateral view illustrating a polarizer according to one embodiment of the present invention.

Technical solutions of the present invention will be clearly and completely described below with reference to specific embodiments and the accompanying drawings. It is apparent that the embodiments are only some embodiments of the present invention, but not all of the embodiments. All other embodiments obtained by those skilled in the art based on the embodiments of the present invention without an inventive step are deemed to be within the protection scope of the present invention.

In the specification, it should be understood that the terms such as "central", "longitudinal", "lateral", "length", "width", "thickness", "above", "below", "front", "rear", "left", "right", "vertical", "horizontal", "top", "bottom", "inner", "outer", "clockwise", "counter-clockwise" should be construed to refer to position relationship or the orientation based on the accompanying drawings. These terms are merely for ease of description and do not alone indicate or imply that the device or element referred to must be set up or operated in a specific orientation. Thus, the present invention is not limited by the directional terms. In addition, terms such as "first" and "second" are used for purposes of description and are not intended to indicate or imply relative importance or significance or impliedly indicate quantity of the technical feature referred to. Thus, the feature defined with "first" and "second" may explicitly or implicitly indicate inclusion of one or more this feature. In the description of the present application, "a plurality of" means two or more than two, unless specified otherwise.

The present invention is embodied in various embodiments and examples in the following description. In order to simplify the description, elements and configurations of some embodiments are described. However, they are only examples and are not intended to limit the present invention. In addition, reference numerals and/or letters may be repeated in different examples of the present invention. The repetitions are for the purpose of simplification and clarity and do not refer to relations between different embodiments and/or configurations. Furthermore, examples of different processes and materials are provided in the present invention. However, it would be appreciated by those skilled in the art that other processes and/or materials may also be used.

The present invention provides a polarizer having a metal wire grid layer (i.e., wire-grid polarizer, or WGP) that can selectively obtain transverse-magnetic (TM) polarized light (i.e. p-light, wherein a polarization direction is perpendicular to a wire grid direction), and reflect transverse-electric (TE) polarized light (i.e. s-light, wherein a polarization direction is parallel to the wire grid direction), thereby achieving polarization.

Accordingly, the present invention provides a polarizer, a manufacturing method thereof, and a display panel. A detailed description is provided below.

First of all, the present invention provides a polarizer comprising a base substrate and a metal wire grid layer disposed on the base substrate. The metal wire grid layer comprises at least two wire grid units spaced apart from each other, each of the wire grid units comprises a plurality of metal wires parallel to each other. The base substrate is provided with a light transmissive region and a light emitting region, and the wire grid units are disposed corresponding to the light emitting region.

Figure 2:
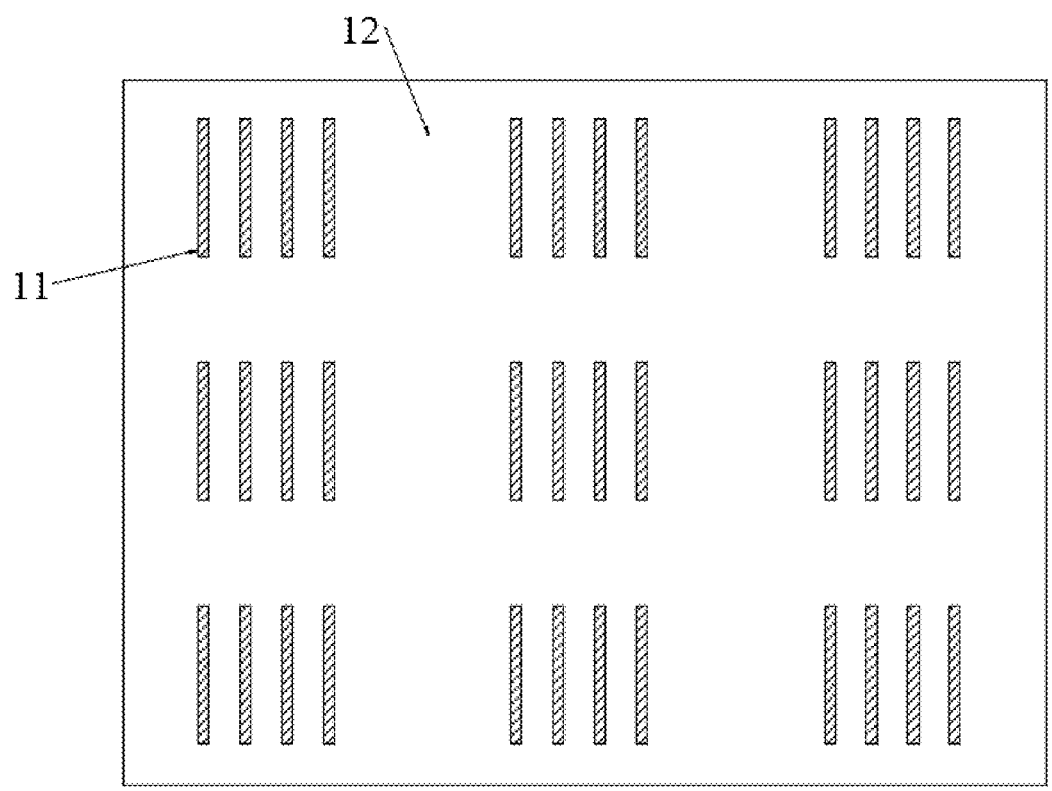
FIG. 2 is a top view illustrating the polarizer according to one embodiment of the present invention.

Referring to FIG. 1, it is a lateral view illustrating a polarizer according to one embodiment of the present invention. The polarizer comprises a base substrate 10 and a metal wire grid layer 13 disposed on the base substrate 10. The metal wire grid layer 13 comprises at least two wire grid units 11 spaced apart from each other. Referring to FIG. 2, it is a top view illustrating the polarizer according to one embodiment of the present invention. The metal wire grid layer 13 comprises at least two wire grid units 11 spaced apart from each other, each of the wire grid units 11 comprises a plurality of metal wires parallel to each other. The base substrate 10 is provided with a light transmissive region 12 and a light emitting region, and the wire grid units 11 are disposed corresponding to the light emitting region.

In the present embodiment, the base substrate 10 is provided with the light transmissive region 12 and the light emitting region, and the wire grid units 11 are disposed corresponding to the light emitting region. In general, in order to enhance a light transmittance of a display device, the wire grid units 11 are arranged at periodic intervals in the metal wire grid layer 13. Each of the wire grid units 11 comprises a plurality of metal wires parallel to each other. The wire grid unit 11 has a polarization function, and is figured to polarize light emitted from RGB to obtain polarized light, or to polarize the polarized light to cause images to appear on a screen. Because the light transmissive region 12 does not have the wire grid unit 11, light output efficiency of the light transmissive region 12 is improved, and the light transmittance of the entire display device is also improved.

In another embodiment of the present invention, the polarizer further comprises a transparent encapsulation layer, and the transparent encapsulation layer fills between the at least two wire grid units 11 and/or between the metal wires. The transparent encapsulation layer is water resistant and oxygen resistant and can block water vapor and oxygen. At the same time, the transparent encapsulation layer also needs to have certain hardness to protect the metal wire grid. Generally, the transparent encapsulation layer is made of polyvinylpyrrolidone or polymethylmethacrylate.

In detail, the polarization characteristics of the polarizer are related to a structure of the wire grid unit. In one embodiment, in order to achieve better polarization, a width of each of the at least two wire grid units 11 preferably ranges from 600 μm to 1500 μm, and a length of each of the at least two wire grid units 11 preferably ranges from 500 μm to 5000 μm.

Moreover, the polarization characteristics of the polarizer are related to a material of the metal wire in the wire grid unit. In one embodiment, in order to achieve better polarization, the metal wire grid is made of at least one of aluminum, chromium, gold, and nickel.

In detail, the polarization characteristics of the polarizer are related to a structure of the metal wires in the wire grid unit. In one embodiment, a width of each of the metal wires preferably ranges from 50 nm to 150 nm, and a height of each of the metal wires preferably ranges from 50 nm to 200 nm. A distance between two adjacent metal wires preferably ranges from 50 nm to 150 nm.

The present invention provides a display panel. The display panel comprises an array substrate, a color filter substrate, a first polarizer disposed on the array substrate, and a second polarizer disposed on the color filter substrate, wherein each of the first polarizer and the second polarizer is the polarizer described in the above embodiments.

Figure 3:
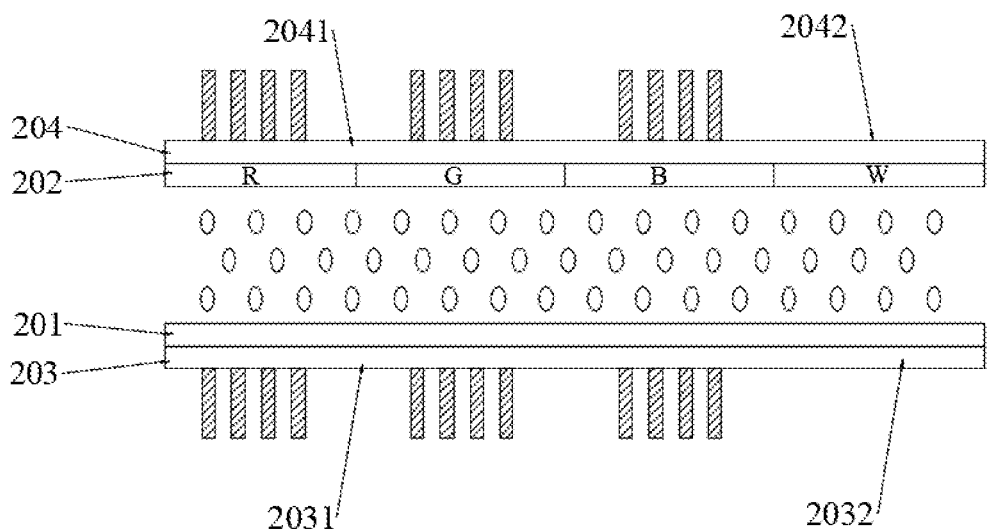
FIG. 3 is a schematic structural view illustrating a display panel according to one embodiment of the present invention.

Referring to FIG. 3, it is a schematic structural view illustrating a display panel according to one embodiment of the present invention. The display panel 201, comprises an array substrate 201, a color filter substrate 202, a first polarizer 203 disposed on the array substrate 201, and a second polarizer 204 disposed on the color filter substrate 202.

The array substrate 201 is disposed corresponding to the color filter substrate 202. The first polarizer 203 is attached to one side of the array substrate 201, and the second polarizer 204 is attached to one side of the color filter substrate 202. A polarization direction of the metal wire grid layer of the first polarizer 203 is perpendicular to a polarization direction of the metal wire grid layer of the second polarizer 204.

A light emitting region 2031 of the first polarizer 203 or a light emitting region 2041 of the second polarizer 204 is arranged corresponding to red, green, blue sub-pixel regions of the color filter substrate 202, and a light transmissive region 2032 of the first polarizer 203 or a light transmissive region 2042 of the second polarizer 204 is disposed corresponding to a white sub-pixel region of the color filter substrate 202. As shown in FIG. 3, the wire grid unit 11 is disposed corresponding to the light emitting region 2031 of the first polarizer 203 or the light emitting region 2041 of the second polarizer 204.

In another embodiment of the present invention, a color gamut of the display panel can also be improved at the same time. The display panel further comprises a quantum dot color filter, and the quantum dot color filter is disposed in the color filter substrate 202. Since a quantum dot emitting material in the quantum dot color filter has higher luminous efficiency, the efficiency for different color light is maximized, a utilization ratio of a backlight source is improved, and at the same time, colored light of higher chroma can be obtained. Therefore, the display panel having the quantum dot color filter can realize high color gamut display.

Figure 4:
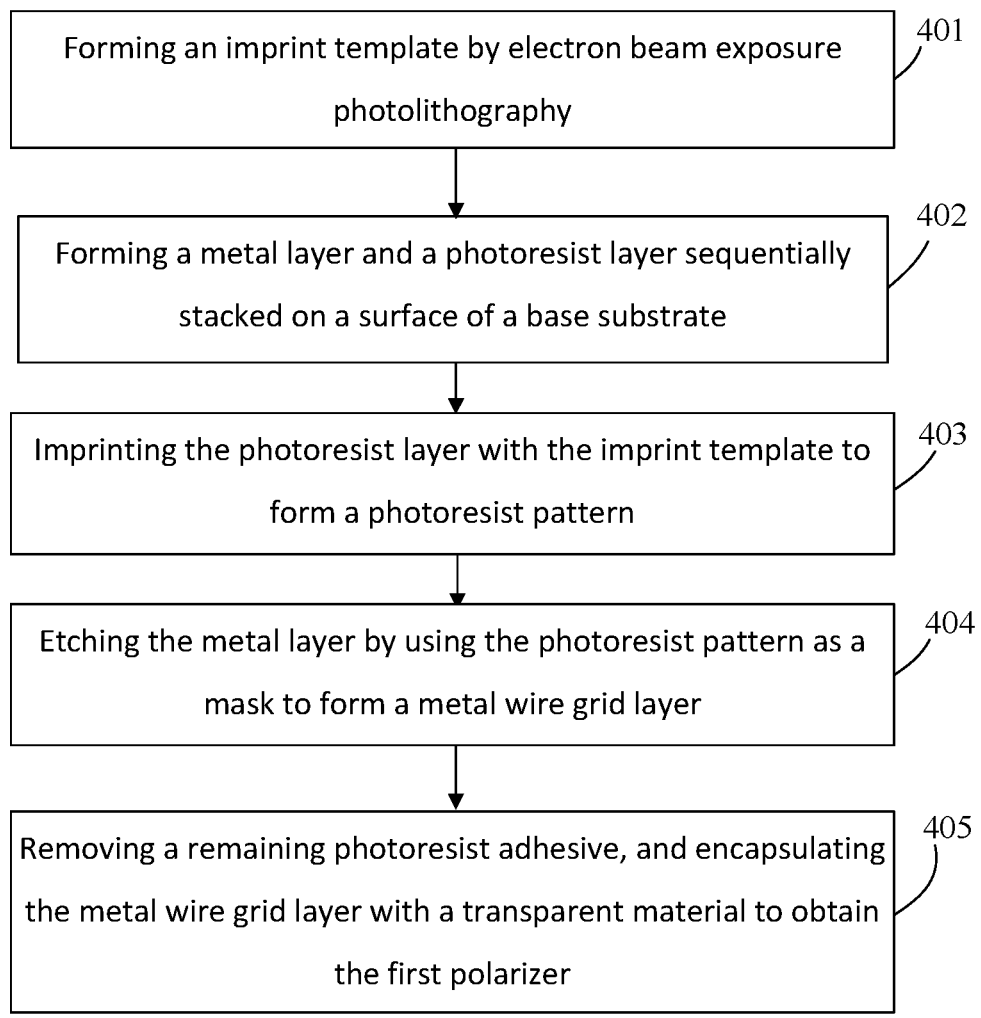
FIG. 4 is a process flow diagram illustrating a manufacturing method of a first polarizer according to one embodiment of the present invention.

Referring to FIG. 4, it is a process follow diagram illustrating a manufacturing method of the first polarizer according to one embodiment of the present invention.

Step 401: forming an imprint template by electron beam exposure photolithography.

Figure 5A:
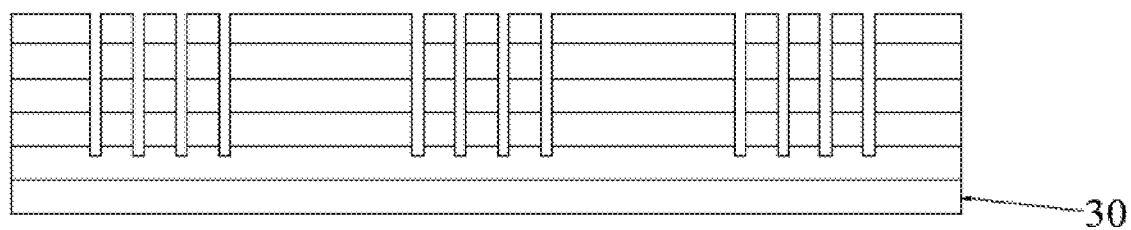
FIGS. 5A to 5D are schematic structural views illustrating a manufacturing method of the display panel according to the one embodiment of the present invention.

In detail, referring to FIG. 5A, it is a lateral view illustrating an imprint template 30 according to the one embodiment of the present invention. In the present embodiment, first, a photoresist material is applied on a base substrate by spin-coating to form a nano-imprint template pattern with a specific wire grid width, a specific wire grid depth, and a wire grid periodic structure. Then, an area of the nano-imprint template pattern on the base substrate is exposed by using an electron beam exposure machine. The exposed area is dissolved with a developing solution to obtain a photoresist template consistent with a designed pattern, and an etching process is performed on the photoresist template. Finally, the photoresist template is rinsed to wash away the remaining photoresist material to obtain the nano-imprint template 30 with the designed pattern.

Step 402: forming a metal layer and a photoresist layer sequentially stacked on a surface of a base substrate.

Figure 5B:
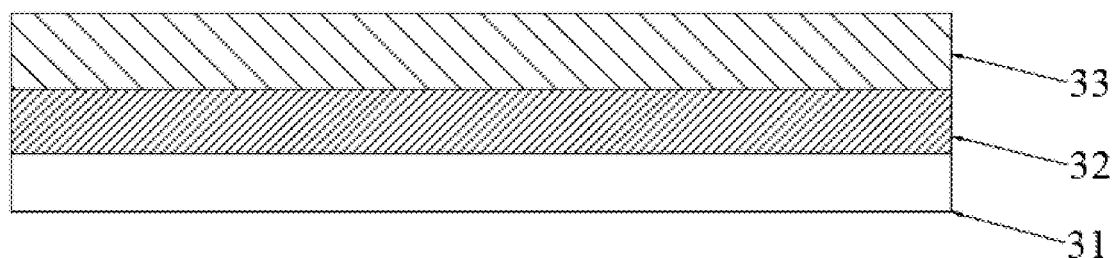

In detail, referring to FIG. 5B, it is a schematic view illustrating a film structure to be imprinted according to the one embodiment of the present invention. In the embodiment, a metal layer 32 and a photoresist layer 33 are sequentially formed from bottom to top on a base substrate 31 by a physical vapor deposition (PVD) method. The metal layer 32 is made of one of aluminum, chromium, gold, and nickel. The photoresist layer 33 is made of a heat-curable imprint adhesive or a UV-curable imprint adhesive.

Step 403: imprinting the photoresist layer with the imprint template to form a photoresist pattern.

Figure 5C:
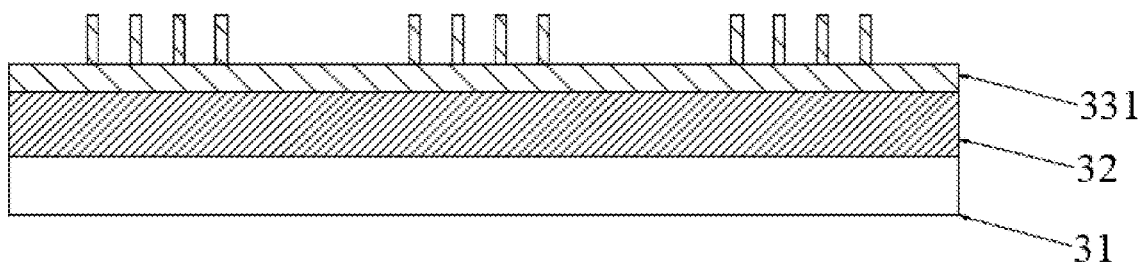

In detail, referring to FIG. 5C, it is a schematic structural view illustrating a structure after the photoresist layer is imprinted according to one embodiment of the present invention. In the present embodiment, when the photoresist layer 32 is a heat-curable imprint adhesive, the photoresist layer 32 is in a molten state by increasing a temperature to be above a glass transition temperature (Tg) of the imprint adhesive, and then the photoresist layer 32 is pressed and imprinted by the imprint template 30. After the imprinting process is completed, the temperature is lowered to cure the photoresist layer. The photoresist pattern 331 can be formed after demolding. On the other hand, when the photoresist layer 32 is a UV-curable imprint adhesive, the imprint template 30 is pressed into the photoresist layer 32, and the photoresist layer 32 is radiated with ultraviolet light to cause the photoresist layer 32 to undergo polymerization to be cured. Then, the photoresist pattern 331 can be formed after demolding.

Step 404: etching the metal layer by using the photoresist pattern as a mask to form a metal wire grid layer, wherein the metal wire grid layer comprises at least two wire grid units spaced from each other, and each of the wire grid units comprises a plurality of metal wires parallel to each other.

Figure 5D:
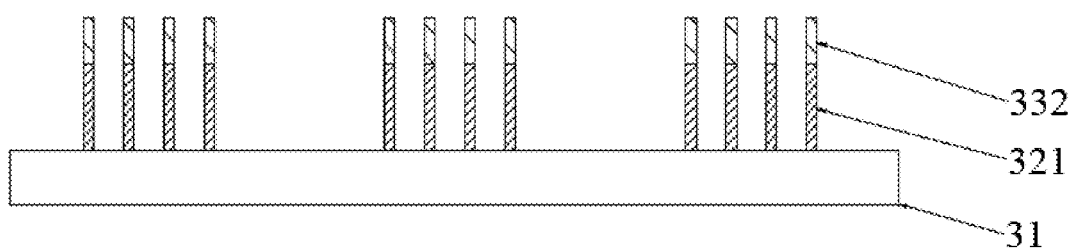

In detail, referring to FIG. 5D, it is a schematic structural view illustrating a structure after the imprinted remaining adhesive and the metal layer are etched according to one embodiment of the present invention. In the embodiment, the imprinted remaining adhesive is dry-etched by $CF_4$, and the metal layer 32 is dry-etched using a gas such as $Cl_2$ or $BCl_3$. The metal wire grid layer comprises a wire grid unit 321 and the remaining photoresist adhesive 332.

Step 405: removing a remaining photoresist adhesive, and encapsulating the metal wire grid layer with a transparent material to obtain the first polarizer.

In detail, the base substrate 10 is provided with a light transmissive region 12 and a light emitting region, and the wire grid units 11 are disposed corresponding to the light emitting region. In the embodiment, the remaining photoresist adhesive is removed by heating mixed solutions of sulfuric acid and hydrogen peroxide.

A manufacturing method of the second polarizer on a surface of the second substrate is a same as the above process, and will not be repeated here.

It should be noted that the above embodiment of the display panel only describes its structure. It can be understood that, in addition to the above structure, the display panel can also include any other necessary structures, such as a liquid crystal layer, thin film transistors, electrodes, alignment films, sealant, and supports; and the present invention is not limited in this regard.

By using the polarizer of the above embodiments, the light transmittance of the display panel is further improved.

In the above embodiments, the description of each embodiment has its own emphasis. For the parts that are not described in detail in one embodiment, please refer to the detailed descriptions of other embodiments above, which will not be repeated here.

In practice, the above units or structures may be implemented as independent entities, or can be combined to become the same one or several entities. For the embodiments of the above units or structures, please refer to the foregoing method embodiments, and a detailed description thereof is not repeated for brevity. For specific practice, please refer to the foregoing embodiments, and details thereof are not repeated herein.

The embodiments of the present invention have been described in detail above to illustrate the working principles of the present invention. The above description is only provided for ease of understanding of the present invention and its main ideas. Those skilled in the art will be able to modify the embodiments and their applications. All such changes/modifications should be deemed to be within the protection scope of the present application. In conclusion, the content of the present disclosure should not be construed as limiting the present invention.

What is claimed is:

1. A display panel, comprising:
an array substrate, a color filter substrate, a first polarizer disposed on the array substrate, and a second polarizer disposed on the color filter substrate, wherein each of the first polarizer and the second polarizer comprising a base substrate, a metal wire grid layer disposed on the base substrate, and a transparent encapsulation layer;
wherein the metal wire grid layer of each of the first polarizer and the second polarizer comprises at least two wire grid units spaced from each other, each of the wire grid units comprises a plurality of metal wires parallel to each other, and the transparent encapsulation layer of each of the first polarizer and the second polarizer fills between the at least two wire grid units and between the metal wires of each of the wire grid units; and
wherein the base substrate of each of the first polarizer and the second polarizer is provided with a light transmissive region and a light emitting region, the wire grid units are disposed corresponding to the light emitting region, the light emitting region of each of the first polarizer and the second polarizer is arranged corresponding to red, green, blue sub-pixel regions of the color filter substrate, and the light transmissive region of each of the first polarizer and the second polarizer is disposed corresponding to a white sub-pixel region of the color filter substrate.

2. The display panel according to claim 1, wherein the display panel further comprises a quantum dot color filter, and the quantum dot color filter is disposed in the color filter substrate.

3. The display panel according to claim 1, wherein each of the metal wires comprises a width ranging from 50 nm to 150 nm and a height ranging from 50 nm to 200 nm, and a distance between each two adjacent metal wires ranges from 50 nm to 150 nm.

4. The display panel according to claim 1, wherein each of the wire grid units comprises a length ranging from 500 um to 5000 um and a width ranging from 600 um to 1500 um.

* * * * *